US010587477B2

(12) United States Patent
Choi

(10) Patent No.: US 10,587,477 B2
(45) Date of Patent: Mar. 10, 2020

(54) SELF-ORGANIZING NETWORK METHOD OF INTERNET OF THINGS AND APPARATUS PERFORMING THE METHOD

(71) Applicant: Electronics and Telecommunications Research Institute, Daejeon (KR)

(72) Inventor: Younghwan Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/132,634

(22) Filed: Sep. 17, 2018

(65) Prior Publication Data

US 2019/0215244 A1 Jul. 11, 2019

(30) Foreign Application Priority Data

Jan. 8, 2018 (KR) .................. 10-2018-0002202
Jun. 27, 2018 (KR) .................. 10-2018-0074130

(51) Int. Cl.
*H04L 12/24* (2006.01)
*H04W 40/24* (2009.01)
*H04W 92/18* (2009.01)
*H04W 40/12* (2009.01)
*H04W 8/00* (2009.01)
*H04W 84/18* (2009.01)

(52) U.S. Cl.
CPC .......... *H04L 41/12* (2013.01); *H04L 41/0853* (2013.01); *H04L 41/0893* (2013.01); *H04W 8/005* (2013.01); *H04W 40/12* (2013.01); *H04W 40/246* (2013.01); *H04W 92/18* (2013.01); *H04W 84/18* (2013.01)

(58) Field of Classification Search
CPC .............................. H04L 45/02; H04L 45/04
See application file for complete search history.

(56) References Cited

U.S. PATENT DOCUMENTS

| 9,860,677 B1* | 1/2018 | Agerstam | ............... H04L 67/28 |
|---|---|---|---|
| 2004/0174829 A1* | 9/2004 | Ayyagari | ............... H04L 45/02 |
| | | | 370/254 |
| 2006/0213766 A1* | 9/2006 | You | ......................... C23F 13/04 |
| | | | 204/228.1 |
| 2008/0008196 A1 | 1/2008 | Hong | |
| 2011/0063999 A1* | 3/2011 | Erdmann | .............. H04W 84/18 |
| | | | 370/254 |
| 2016/0205616 A1* | 7/2016 | Oren | ...................... H04W 4/08 |
| | | | 370/254 |

(Continued)

*Primary Examiner* — Melanie Jagannathan
(74) *Attorney, Agent, or Firm* — Kile Park Reed & Houtteman PLLC

(57) ABSTRACT

Disclosed are a self-organizing network (SON) method in an Internet of things (IoT) environment, and an apparatus performing the SON method. The SON method includes receiving neighboring device information from at least one neighboring IoT device of an IoT device, updating device information of the IoT device based on the received neighboring device information, and determining whether the IoT device is a coordinator candidate based on at least one of a number of network interfaces, a number of neighbor links connected to the network interfaces, or a ratio of remaining energy, which is included in the device information.

16 Claims, 8 Drawing Sheets

- Application server
● A-type IoT device (e.g., BLE)
◉ B-type IoT device (e.g., IEEE802.15.4)
▢ A&B-type IoT device (e.g., BLE + IEEE802.15.4)
----- A-type connection (e.g., BLE)
——— B-type connection (e.g., IEEE802.15.4)

Homogeneous SON

Heterogeneous SON

(56) References Cited

U.S. PATENT DOCUMENTS

| | | |
|---|---|---|
| 2017/0230240 A1 | 8/2017 | Kim et al. |
| 2018/0091407 A1* | 3/2018 | Tervonen .................. H04J 3/06 |
| 2019/0124590 A1* | 4/2019 | Chiang ............. H04W 52/0203 |

* cited by examiner

FIG. 4

| Device_ID |||||||
|---|---|---|---|---|---|---|
| Self | C.Coordinator || R.Energy | C.Energy | IF.Count ||
| IF.No#1 | IF.Type | IF.Range | IF.Speed | IF.Link | IF.Coordinator ||
| IF.No#2 | IF.Type | IF.Range | IF.Speed | IF.Link | IF.Coordinator ||
| ⋮ |||||||
| IF.No#N | IF.Type | IF.Range | IF.Speed | IF.Link | IF.Coordinator ||

800

SELF-ORGANIZING NETWORK METHOD OF INTERNET OF THINGS AND APPARATUS PERFORMING THE METHOD

CROSS-REFERENCE TO RELATED APPLICATION(S)

This application claims the priority benefit of Korean Patent Application No. 10-2018-0002202 filed on Jan. 8, 2018, and Korean Patent Application No. 10-2018-0074130 filed on Jun. 27, 2018, in the Korean Intellectual Property Office, the disclosures of which are incorporated herein by reference for all purposes.

BACKGROUND

1. Field

One or more example embodiments relate to an interterminal network organizing and discovering method for a self-organizing network (SON) of heterogeneous terminals in a low-power networking field of the Internet of things (IoT), and to an apparatus performing the method.

2. Description of Related Art

In an Internet of things (IoT) environment, network configurations and conditions may be different from those of existing networks in terms of network deployment, network size, the number of networked devices, connectivity, multi-hop communication, traffic pattern, security level, mobility, and quality of service (QoS). For example, an infrastructure-unsupported IoT area network is independent from an existing infrastructure network.

In an IoT environment, a self-organizing network (SON), or self-organization networking, indicates a communication process including network protocols among networked heterogeneous devices. An existing process for existing networks may not completely support or consider such heterogeneous devices in an infrastructure-unsupported IoT area network. Thus, a SON may be needed for IoT.

SUMMARY

An aspect provides a method of discovering a communication terminal and organizing a network to connect heterogeneous terminals to solve an issue arising from a self-organizing network (SON) that considers only an existing type of communication between homogeneous terminals.

According to an aspect, there is provided a SON method in an Internet of things (IoT) environment, the SON method including receiving neighboring device information from at least one neighboring IoT device of an IoT device, updating device information of the IoT device based on the received neighboring device information, and determining whether the IoT device is a coordinator candidate based on at least one of a number of network interfaces, a number of neighbor links connected to the network interfaces, or a ratio of remaining energy, which is included in the device information. The coordinator candidate refers to a candidate for a coordinator configured to function as a network gateway.

The number of network interfaces, the number of neighbor links connected to the network interfaces, and the ratio of remaining energy may be considered in sequential order.

The determining may include determining the IoT device to be the coordinator candidate in response to the number of network interfaces being greater than or equal to 2, determining the IoT device to be the coordinator candidate in response to the number of neighbor links connected to the network interfaces being greater than or equal to 2, and determining the IoT device to be the coordinator candidate in response to the ratio of remaining energy being greater than a threshold value.

The determining may be performed for each network interface.

The SON method may further include updating bit information included in the device information based on a result of the determining.

The SON method may further include determining the coordinator among a plurality of neighboring IoT devices each being a coordinator candidate and configured to transmit device information, based on a network characteristic.

The network characteristic may include at least one of energy, a network range, or a network speed.

The determining of the coordinator may include determining an IoT device having a greatest value of the ratio of remaining energy or an IoT device having a smallest value of a ratio of consumed energy among the neighboring IoT devices to be the coordinator when energy-centric networking is required, determining an IoT device having a widest network interface range among the neighboring IoT devices to be the coordinator when broadband networking is required, and determining an IoT device having a greatest data transfer rate among the neighboring IoT devices to be the coordinator when networking requiring a communication speed and performance is required.

The energy-centric networking, the broadband networking, and the networking requiring a communication speed and performance may be considered in sequential order.

The determining of the coordinator may be performed for each network interface.

According to another aspect, there is provided an IoT device for a SON, the IoT device including at least one network interface, and a processor configured to execute instructions to organize a network with at least one neighboring IoT device of the IoT device through the network interface. When the instructions are executed, the processor may be configured to receive neighboring device information from the at least one neighboring IoT device, update device information of the IoT device based on the received neighboring device information, and determine whether the IoT device is a coordinator candidate based on at least one of a number of network interfaces, a number of neighbor links connected to the network interfaces, or a ratio of remaining energy, which is included in the device information. The coordinator candidate refers to a candidate for a coordinator configured to function as a gateway of the network.

The processor may be configured to consider the number of network interfaces, the number of neighbor links connected to the network interfaces, and the ratio of remaining energy, in sequential order.

In response to the number of network interfaces being greater than or equal to 2, the processor may be configured to determine the IoT device to be the coordinator candidate. In response to the number of neighbor links connected to the network interfaces being greater than or equal to 2, the processor may be configured to determine the IoT device to be the coordinator candidate. In response to the ratio of remaining energy being greater than a threshold value, the processor may be configured to determine the IoT device to be the coordinator candidate.

The processor may be configured to determine whether the IoT device is the coordinator candidate for each network interface.

The processor may be configured to update bit information included in the device information based on a result of the determining.

The processor may be configured to determine, to be the coordinator, among a plurality of neighboring IoT devices each being a coordinator candidate and configured to transmit device information, based on a network characteristic.

The network characteristic may include at least one of energy, a network range, or a network speed.

When energy-centric networking is required, the processor may be configured to determine, to be the coordinator, an IoT device having a greatest value of the ratio of remaining energy among the neighboring IoT devices or an IoT device having a smallest value of a ratio of consumed energy. When broadband networking is required, the processor may be configured to determine, to be the coordinator, an IoT device having a widest network interface range among the neighboring IoT devices. When networking requiring a communication speed and performance is required, the processor may be configured to determine, to be the coordinator, an IoT device having a greatest data transfer rate among the neighboring IoT devices.

The processor may be configured to consider the energy-centric networking, the broadband networking, and the networking requiring a communication speed and performance, in sequential order.

The processor may be configured to determine the coordinator for each network interface.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIG. 4 is a diagram illustrating an example of device information to be broadcasted by an IoT device according to an example embodiment;

DETAILED DESCRIPTION

Figure 1:
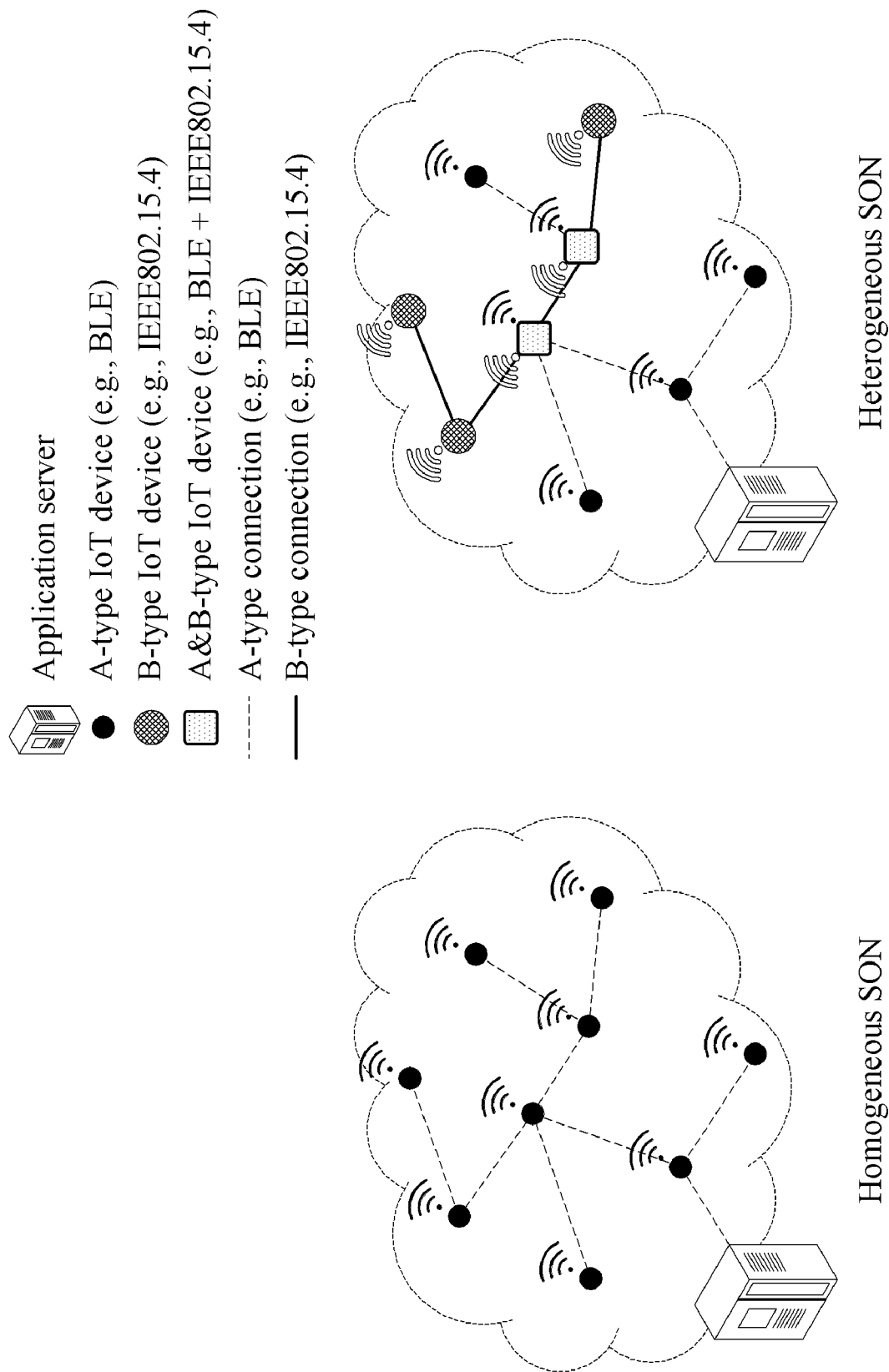
FIG. 1 is a diagram illustrating examples of an infrastructure-unsupported Internet of things (IoT) area network according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

In an Internet of things (IoT) network with various dynamic phase changes, a self-organizing network (SON) method described herein may be applicable, and various services and added values may be obtained using a device, for example, a mobile phone, in which various wireless communication technologies are provided.

FIG. 1 is a diagram illustrating examples of an infrastructure-unsupported IoT area network according to an example embodiment.

Referring to FIG. 1, IoT devices that organize a network may be homogeneous or heterogeneous devices due to an IoT characteristic. Herein, the term "organize" a network may be used interchangeably with "configure," "form," or "establish" a network, or be construed as including the same meanings as those of the interchangeable terms. In an infrastructure-unsupported IoT area network, IoT devices may be provided for peer-to-peer connectivity or server-client connectivity as illustrated in FIG. 1.

In a case of a network formed by homogeneous IoT devices, an IoT device may form a link with all connectable neighboring IoT devices as illustrated in a left-side portion of FIG. 1. In a case of a network formed by heterogeneous IoT devices, an IoT device may not necessarily form a link with a neighboring IoT device simply because the neighboring IoT device is present adjacent to the IoT device as illustrated in a right-side portion of FIG. 1. This is because IoT devices may use different types of wireless network technology. For example, as illustrated in FIG. 1, an A-type IoT device may use Bluetooth, and a B-type IoT device may use IEEE 802.15.4 which is a technical standard of the Institute of Electrical and Electronics Engineers (IEEE).

In the infrastructure-unsupported IoT area network, IoT devices may perform various operations, for example, discovering neighboring nodes and routing for a communication service, without being dependent on infrastructure entities.

For example, devices that may function as a host and a router may be discovered from among IoT devices, for example, network devices. Herein, the host may indicate a communication terminal included in a network and may establish a link with a single neighboring node. The router may establish a link with two or more neighboring terminals among communication terminals included in a network, and may connect the neighboring terminals or forward data therebetween. The router may also be referred to as a coordinator.

In networking in an IoT environment, all may be interconnected to global information, and may also be interconnected to communication infrastructures and devices based on different hardware platforms and networks as illustrated in the right-side portion of FIG. 1. Herein, a state of an IoT device, for example, a context including a location and a speed and whether the IoT device is sleeping, waking up, connected, or disconnected, may be changed dynamically.

To adapt to different application domains and communication environments as illustrated in the right-side portion of FIG. 1, an IoT networking function may need to support a SON. In such a SON network as illustrated in the right-side portion of FIG. 1, all IoT devices in the network may secure interconnectivity through interworking, transmit and receive data, and autonomously control the network.

A SON may include self-managing, self-configuring, self-healing, self-optimizing, and self-protecting techniques and/or mechanisms. In addition, to ensure a normal operation, manageability may also be required for IoT. In general, an IoT application may be run automatically without a participation of human beings. However, an entire operation process of the IoT application may be managed by relevant parties.

To achieve connectivity among things in an IoT environment, a connectivity capability may need to be independent from a certain application program domain. An integration of heterogeneous communication technology and end-to-end intelligence may be considered in conjunction of intelligence of communications and intelligence of services. Herein, location-based communication and context-based communication may also be considered.

A SON may perform a self-managing function including a self-configuring function, a self-optimizing function, a self-healing function, and a self-protecting function, thereby operating and optimizing a network without being dependent on a human decision and a centralized network management system.

In an IoT environment, a SON may configure and optimize a network topology to support an IoT service. The SON may focus on self-configuration for a network topology, self-device discovery, and self-optimization based on dynamic network circumstances of an infrastructure-unsupported IoT area network.

An IoT device may have various functions, or capabilities. These functions or capabilities may be related to, for example, processing, memory, battery power, mobility, bit rate, a transmission range, and the like. In addition, as illustrated in the left-side portion of FIG. 1, IoT devices may have different wireless access technologies. Such resource characteristics may affect performance of a SON. For example, a SON function may be determined for energy-efficient networking, and thus battery power of an IoT device may be one of important considerations. Thus, the resource characteristics may be considered.

As described above, in an infrastructure-unsupported IoT area network, a SON for IoT may perform networking without a need for a communication device such as a router present in an existing network infrastructure and a communication method of such a communication device. In the infrastructure-unsupported IoT area network, requirements of the SON for IoT are as follows.

1) Support for a Heterogeneous IoT Network

IoT devices in a heterogeneous IoT network may have various functions and access methods. A SON may be suitable for characteristics of such heterogeneous IoT devices.

2) SON Decentralization

A SON function may be distributed to a suitable IoT device based on an IoT service. The IoT device may simultaneously perform various roles for different services. When the IoT device performs a plurality of roles, the roles may be changed based on IoT service requirements and conditions. Thus, a SON function may be distributed to a suitable IoT device, without being concentrated on a static IoT device, for service management.

3) Support for Different Networking Performance Levels

A SON may support a distribution function at various performance levels for various IoT services. For example, performance may be based on an energy-centric IoT service, a processor- or time-centric IoT service, and the like. Various optimization options may provide different results based on networking performance of an IoT service.

4) Self-Configuration and Self-Management for Networking

A SON may support self-configuration and self-management for networking. The self-configuration may include all possible types of processes to start networking, for example, identification, neighbor and route discovery, and the like. The self-management may include, for example, data routing, congestion control, and the like after starting the networking.

5) Support for Network Robustness

A SON may support recovery for a networking failure. When a network failure occurs, a neighboring IoT device may immediately detect such a failure and discover another device in lieu of a device in which the network failure occurs. When there is a backup device, the backup device may recover an existing configuration.

For example, when IoT devices move or power is insufficient, a network failure such as a failure in a routing path may occur. As soon as the IoT devices detect such an error, the IoT devices may discover another routing path for network robustness.

Figure 2:
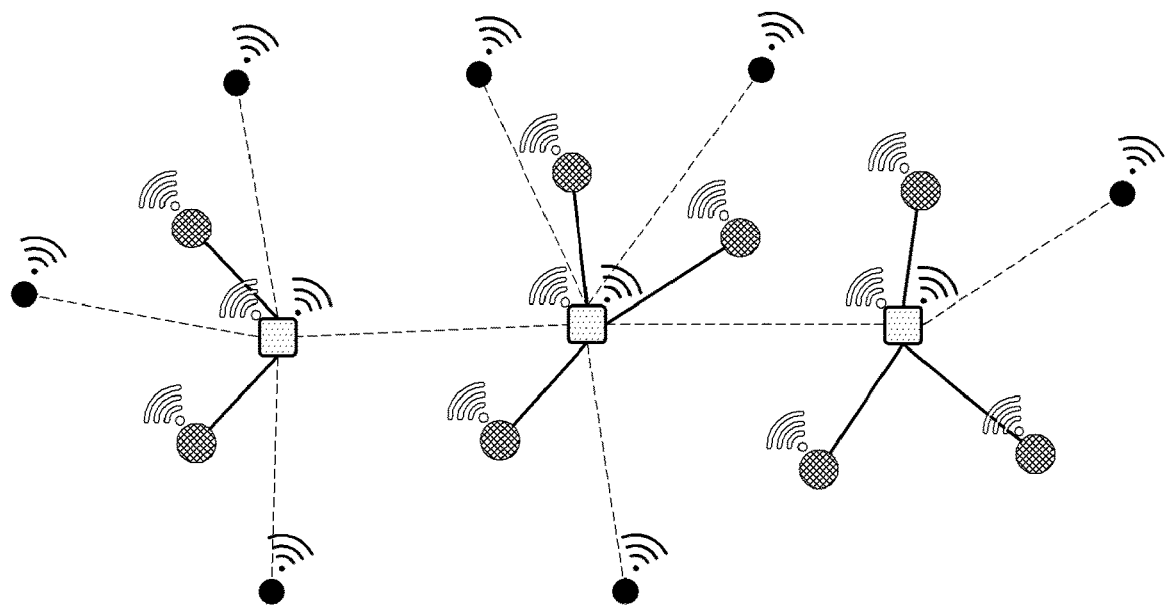
FIG. 2 is a diagram illustrating an example of a network formed by a self-organizing network (SON) among heterogeneous IoT devices according to an example embodiment.

FIG. 2 is a diagram illustrating an example of a network formed by a SON among heterogeneous IoT devices according to an example embodiment.

Referring to FIG. 2, when all IoT devices are connectable to neighboring IoT devices, an IoT device may establish a communication link with a neighboring IoT device. Herein, a single IoT device equipped with two or more different communication technologies is needed to interconnect different types or models of communication terminals. For example, a smartphone may be equipped with different communication technologies, such as, for example, long-term evolution (LTE), Bluetooth, WiFi, near-field communication (NFC), and the like, and these technologies may be used differently based on a purpose of use. When such an IoT device functions as a router, more IoT devices may effectively establish a single network.

A SON function may be distributed and assigned to each IoT device, and the function may be used to exchange information to establish and maintain a network. Thus, IoT devices may be classified into two groups based on their roles.

IoT devices (A-type devices and B-type devices of FIG. 2)

IoT coordinators (A- and B-type devices of FIG. 2)

An IoT coordinator may be an IoT device selected from among all IoT devices. The IoT coordinator may organize routing paths for other IoT devices for networking. In addition, the IoT coordinator may perform a role as a gateway for neighboring IoT devices, for example, devices forming different neighboring networks. The IoT coordinator may also perform a function for connection to various IoT devices.

A function of qualifying an IoT coordinator, or a function of selecting an IoT coordinator, may be determined based on a performance option. The performance option may be obtained by a predefined optimization policy. The optimization policy may be determined based on a service requirement.

In an IoT environment, a core of a SON may be discovering an IoT device equipped with a plurality of different communication technologies, for example, an A- and B-type IoT device as illustrated in FIG. 2, and organizing or configuring a network with its characteristics that is suitable for a purpose of use of the network based on the discovering.

Figure 3:
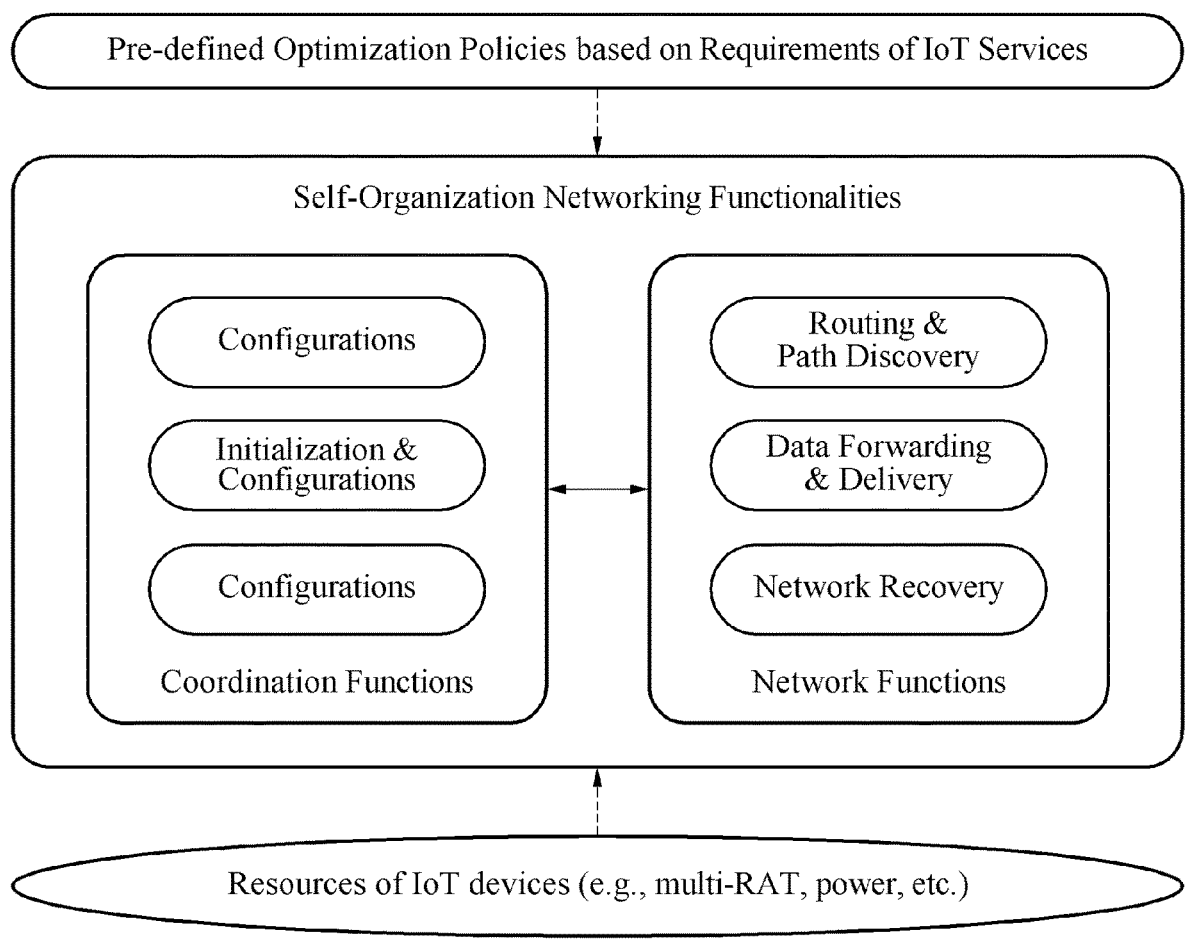
FIG. 3 is a diagram illustrating an example of a SON function architecture according to an example embodiment.

FIG. 3 is a diagram illustrating an example of a SON function architecture according to an example embodiment.

Referring to FIG. 3, a SON function may be classified into a coordination functionality and a network functionality.

A SON may be relatively simpler than existing networking, and thus more effective and dynamic based on a characteristic of a service.

A predefined optimization policy may be determined or drafted based on requirements of an IoT service and an application program, and the coordination functionality and the network functionality may be run by the optimization policy.

The optimization policy may be used to analyze a current state and a requirement of a service, and determine an optimized policy based on the requirement and constraints. Herein, how the optimization policy is determined may vary based on a characteristic of a requirement of an IoT service. For example, when an IoT service requires energy-efficient networking, all processes may focus on energy saving. When an IoT service requires high performance, for example, high-speed or massive data processing, a SON may be established for the high performance. Such a policy may vary based on a characteristic of a required IoT service.

The coordination functionality may include, for example, coordinator election or selection, and initialization, configuration, and identification to establish a connection between two neighboring devices, which are performed to establish a network topology.

1) Coordinator Election

A SON may be initiated from a coordinator side as illustrated in FIG. 3. A coordinator may perform two important roles of managing a neighboring IoT device and forwarding a packet, and thus a most suitable IoT device may need to be the coordinator.

A qualification of the coordinator may be determined by an optimization policy. The coordinator may collect resource information, or device information, of neighboring devices to perform the management role. For example, the resource information may include information about, for example, remaining energy and processing performance.

The resource information may be used to connect neighboring IoT devices and correct an error for recovery. When the resource information is collected, the coordinator may start connecting all the neighboring IoT devices, and establish a network topology, for example, a start topology, from a perspective of the coordinator.

The coordinator may perform a role as a gateway for neighboring IoT devices. When one of coordinators fails, coordinator election may be initiated and another optimal IoT device may be selected as a new coordinator from among IoT devices through a recovery mechanism.

2) Initialization and Configuration

All IoT devices may belong to or be connected to one of coordinators for management. The IoT devices may be connected to one of the coordinators, and a start topology may be established based on the coordinator. Such a connection may be used for data transfer or data forwarding.

When a coordinator is selected, the coordinator may broadcast an advertisement packet. When neighboring IoT devices receive the advertisement packet, the neighboring IoT devices may send, to the coordinator, a connection request packet as a response. Herein, a connection between the IoT devices may be established based on the selected coordinator. When the selected coordinator fails, all the neighboring IoT devices may be disconnected, and such a coordinator election process may be started again.

3) Identification

An existing identification networking protocol may not be always suitable for an IoT device, for example, a constrained IoT device. For example, an infrastructure-unsupported network IoT device may require a new identification system and a networking protocol that are suitable for an optimization policy. The new identification system may need to be simple for energy efficiency or high performance.

After a SON is established, the network functionality may be processed. The network functionality may enable data communication among infrastructure-unsupported network IoT devices. The network functionality may include, for example, routing and path discovery for an IoT device in an established network to receive and transmit data, data forwarding and delivery to effectively forward data, and network recovery to correct an error when it occurs on a path.

1) Routing and Path Discovery

The network functionality may include establishing a routing path for packet delivery based on a selected coordinator and an optimization policy. When a network topology is established from a perspective of coordinators, a connection among the coordinators may be established. Based on the optimization policy, the connection among the coordinators may enable another routing path or another network topology to be established. A routing path may then be established based on a coordinator between a source device and a target device.

2) Data Forwarding and Delivery

Data forwarding may be performed by three types of traffic pattern, for example, unicasting, multicasting, and broadcasting. For example, when an IoT service requires high performance, networking technology such as multihoming may be used. The data forwarding may be performed by a coordinator, and an IoT device may exchange data with the coordinator.

3) Network Recovery

There may be two types of network error—a failure of a coordinator and a failure of an IoT device. For example, when one of coordinators fails, one among neighboring IoT devices may become a coordinator. When one of connections between a coordinator and IoT devices fails, the coordinator may attempt to be reconnected to an IoT device to which the coordinator fails to be connected initially. Herein, when a connection is cancelled or when disconnected, the coordinator may no longer manage information of an IoT device from which the coordinator is disconnected.

FIG. 4 is a diagram illustrating an example of device information to be broadcasted by an IoT device according to an example embodiment.

All IoT devices may repetitively broadcast their own information as illustrated in FIG. 4, which is device information or resource information. The device information may include the following information.

Referring to FIG. 4, "Device_ID" indicates a device identifier. For example, Device_ID may be an identifier number assigned to an IoT device.

"Self" indicates bit information used to set a TRUE value, or 1, when an IoT device broadcasts its own information. For example, Self is used to determine whether device information is its own information of an IoT device or neighboring device information of a neighboring IoT device. In this example, TRUE or 1 indicates device information of an IoT device itself, and FALSE or 0 indicates neighboring device information of a neighboring IoT device.

"C.Coordinator" indicates bit information used to set a TRUE value, or 1, when a device is selected as a coordinator candidate. For example, C.Coordinator is used to determine whether an IoT device is a coordinator candidate or not, and TRUE or 1 indicates a coordinator candidate and FALSE or 0 indicates a general terminal.

"R.Energy" indicates a ratio of remaining energy, and "C.Energy" indicates a ratio of energy consumed for a certain amount of time, or a ratio of consumed energy.

"IF.Count" indicates the number of network interfaces included or equipped in a device, and "IF.No#N" indicates a sequence number used to identify a network interface included in a device. "IF.Type" indicates a type or a name of a network interface, for example, IEEE802.15.4, B:IEEE802.11, BLE, NFC, Z-WAVE, LoBAC, and the like.

"IF.Range" indicates a radio frequency (RF) range of a network interface, for example, a wireless radius (in a unit of meter [m]). "IF.Speed" indicates a data transfer rate, for example, a wireless link speed (in a unit of bits per second [bps]). "IF.Link" indicates a list of connected neighboring devices, for example, connected neighboring IoT devices, links, or nodes.

"IF.Coordinator" indicates a device identifier of a connected coordinator.

Each time an IoT device receives device information of a neighboring IoT device, the IoT device may discover a coordinator candidate and a connection to establish a network based on the received device information.

Hereinafter, how a coordinator candidate and a connection are discovered using device information to establish a network will be described in detail with reference to FIGS. 5 and 6.

Figure 5:
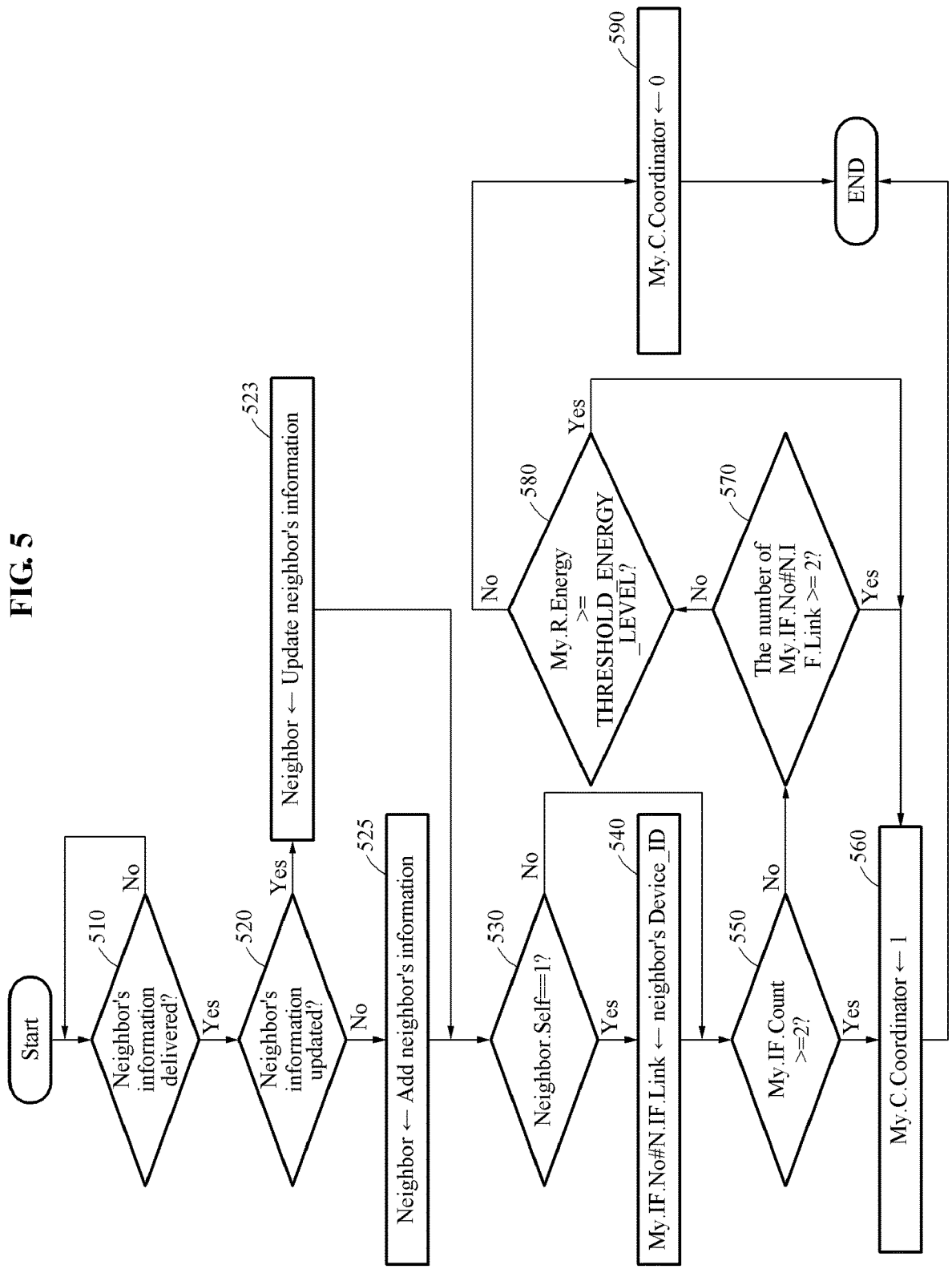
FIG. 5 is a flowchart illustrating an example of a method of discovering a coordinator candidate according to an example embodiment.

FIG. 5 is a flowchart illustrating an example of a method of discovering a coordinator candidate according to an example embodiment.

Referring to FIG. 5, in operation 510, an IoT device periodically verifies whether neighboring device information is received from at least one neighboring IoT device.

In operation 520, the IoT device determines whether the neighboring device information of the neighboring IoT device is updated or not. In operation 523, when the neighboring IoT device is present in a list, for example, a list of connected neighboring devices, the IoT device updates previous neighboring device information to be the received neighboring device information, for example, device information that is most recently received from a neighboring IoT device. In operation 525, when the neighboring IoT device is not present in the list, the IoT device adds the neighboring device information that is newly received from the neighboring IoT device.

In operation 530, the IoT device determines whether the neighboring device information received from the neighboring IoT device is device information of the neighboring IoT device itself. For example, the IoT device may determine whether the neighboring device information is its own device information of the neighboring IoT device by verifying bit information of Self included in the neighboring device information.

In operation 540, when the neighboring device information is the device information of the neighboring IoT device, the IoT device adds a device identifier of the neighboring IoT device to IF.Link corresponding to IF.No#N of device information of the IoT device. Herein, the neighboring IoT device may be a neighboring node that has wireless link-based direct connectivity to the IoT device through a network interface included in the IoT device. That is, the neighboring IoT device may be directly connected to the IoT device through a wireless link.

The IoT device may determine whether the IoT device is a coordinator candidate based on the device information of the IoT device. The operations to be described hereinafter are merely provided as an example, and thus the operations are not limited to the example.

The IoT device may determine whether the neighboring IoT device is a coordinator candidate based on at least one of a number of network interfaces, a number of neighbor links connected to the network interfaces, or a ratio of remaining energy, which is included in device information, in operations 550, 570, 580. For example, the IoT device may determine whether the IoT device is a coordinator candidate by considering, in sequential order, a number of network interfaces, a number of neighbor links connected to the network interfaces, and a ratio of remaining energy.

In operation 550, the IoT device determines whether the number of network interfaces of the IoT device is greater than or equal to 2 based on IF.Count of the device information. In operation 560, when the number of network interfaces is greater than or equal to 2, the IoT device determines the IoT device to be a coordinator candidate.

In operation 570, when the number of network interfaces of the IoT device is less than 2, the IoT device determines whether the number of links connected to the network interfaces is greater than or equal to 2 based on IF.Link corresponding to IF.No#N of the device information. In operation 560, when the number of links connected to the network interfaces is greater than or equal to 2, the IoT device determines the IoT device to be a coordinator candidate.

In operation 580, when the number of links connected to the network interfaces is less than 2, the IoT device determines whether the ratio of remaining energy is greater than or equal to a threshold energy value, for example, THRESHOLD_ENERGY_LEVEL, based on R.Energy of the device information. Herein, the threshold energy value, or THRESHOLD_ENERGY_LEVEL, indicates a threshold remaining energy level used to determine whether an amount of remaining energy is suffient to perform a role as a coordinator. In operation 560, when the ratio of remaining energy is greater than or equal to the threshold energy value, the IoT device determines the IoT device to be a coordinator candidate. In operation 590, when the ratio of remaining energy is less than the threshold energy value, the IoT device determines the IoT device not to be a coordinator candidate.

As described above, when the number of network interfaces is 2, the IoT device may assign the IoT device itself as a coordinator candidate. In addition, when the number of links connected to the network interfaces is greater than or equal to 2 or the ratio of remaining energy is greater than or equal to the threshold energy value, although the number of network interfaces is 1, the IoT device may also assign the IoT device itself as a coordinator candidate.

After the IoT device determines whether the IoT device is a coordinator candidate, a result of the determining may be applied to C.Coordinator of the device information. For example, when the IoT device is determined to be a coordinator candidate, the IoT device may apply, to C.Coordinator, bit information indicating a TRUE value or 1. Conversely, when the IoT device is determined not to be a coordinator candidate, the IoT device may apply, to C.Coordinator, bit information indicating a FALSE value or 0.

When the neighboring device information is received from the neighboring IoT device, the IoT device may update the device information of its own and broadcast the updated device information to neighbors. A network coordinator candidate may also be discovered through an algorithm, and a device with a multiple interface or a multiple connector may become a coordinator candidate. In addition, when a SON requires energy saving, an energy-efficient device may become a coordinator candidate.

When the neighboring device information is received from the neighboring IoT device, the IoT device may update the device information of its own and broadcast the updated device information to neighbors. For example, IF.Link and C.Coordinator corresponding to IF.No#N of the device information may be updated.

The operations described above with reference to FIG. 5 may be performed for each network interface of an IoT device.

Figure 6:
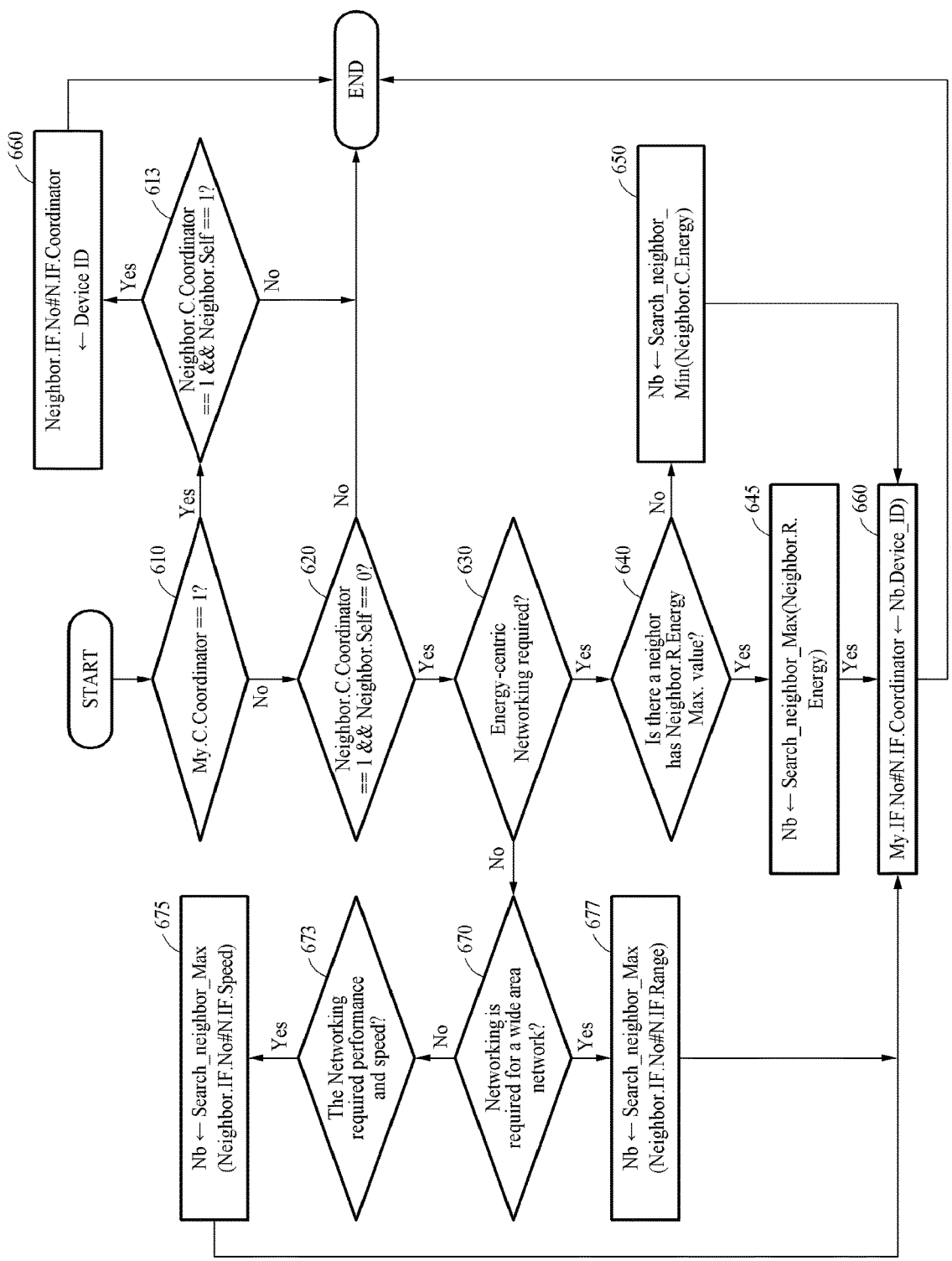
FIG. 6 is a flowchart illustrating an example of a method of discovering a coordinator to establish a network according to an example embodiment.

FIG. 6 is a flowchart illustrating an example of a method of discovering a coordinator to establish a network according to an example embodiment.

An IoT device may determine a coordinator to establish a network among coordinator candidates based on device information of the IoT device and neighboring device information received from at least one neighboring IoT device. The method to be described hereinafter with reference to FIG. 6 is provided merely as an example, and thus the method is not limited to the example.

Referring to FIG. 6, in operation 610, an IoT device determines whether the IoT device is a coordinator candidate. Herein, the coordinator candidate refers to a candidate for a coordinator.

In operation 613, when the IoT device is a coordinator candidate, the IoT device determines whether a neighboring IoT device is a coordinator candidate and whether neighboring device information is device information of the neighboring IoT device. When the neighboring IoT device is a coordinator candidate and the neighboring device information is the device information of the neighboring IoT device, the IoT device determines the neighboring IoT device to be the coordinator. In operation 660, the IoT device updates the device information of the IoT device by applying a device identifier of the neighboring IoT device to IF.Coordinator corresponding to IF.No#N of the device information of the IoT device.

In operation 620, when the IoT device is not a coordinator candidate, the IoT device determines whether the neighboring IoT device is a coordinator candidate and whether the neighboring device information is the device information of the neighboring IoT device.

The IoT device may determine the coordinator among a plurality of neighboring IoT devices each being a coordinator candidate and configured to transmit device information of its own based on a network characteristic, in operations 630, 670, and 673. For example, the network characteristic may include at least one of energy, a network range, or a network speed. The IoT device may determine the coordinator by considering, in sequential order, energy-centric networking, broadband networking, and communication speed and performance, based on the network characteristic.

In operation 630, the IoT device determines whether energy-centric networking is required.

In operation 640, the IoT device determines whether there is a device having a greatest value of a ratio of remaining energy among the neighboring IoT devices.

In operation 645, when there is the device having the greatest value of the ratio of remaining energy, the IoT device determines the device having the greatest value of the ratio of remaining energy to be the coordinator. Otherwise, in operation 650, the IoT device determines, to be the coordinator, a device having a smallest value of a ratio of energy consumed for a certain time or a ratio of consumed energy, among the neighboring IoT devices.

In operation 670, the IoT device determines whether broadband networking with a wide wireless radius is required. In operation 677, the IoT device determines, to be the coordinator, a device with a greatest interface range among the neighboring IoT devices. For example, a coordinator candidate having a long-range network interface, such as, for example, LoRa (indicating long range), SigFox, IEEE802.11ah, Wi-SUN (indicating wireless smart utility network), narrowband (NB)-IoT, and the like.

In operation 673, the IoT device determines whether networking requiring a communication speed and performance is required. In operation 675, the IoT device determines, to be the coordinator, a device having a greatest data transfer rate among the neighboring IoT devices.

In operation 660, the IoT device updates the device information of the IoT device by applying a device identifier of the determined coordinator, for example, to IF.Coordinator corresponding IF.No#N in the device information of the IoT device.

As described above, when a SON needs to establish a network supporting energy, a throughput, and a network range based on an environmental circumstance, a coordinator suitable for characteristics of the network may be selected through an algorithm.

The operations described above with reference to FIG. 6 may be performed for each network interface of an IoT device.

Figure 7:
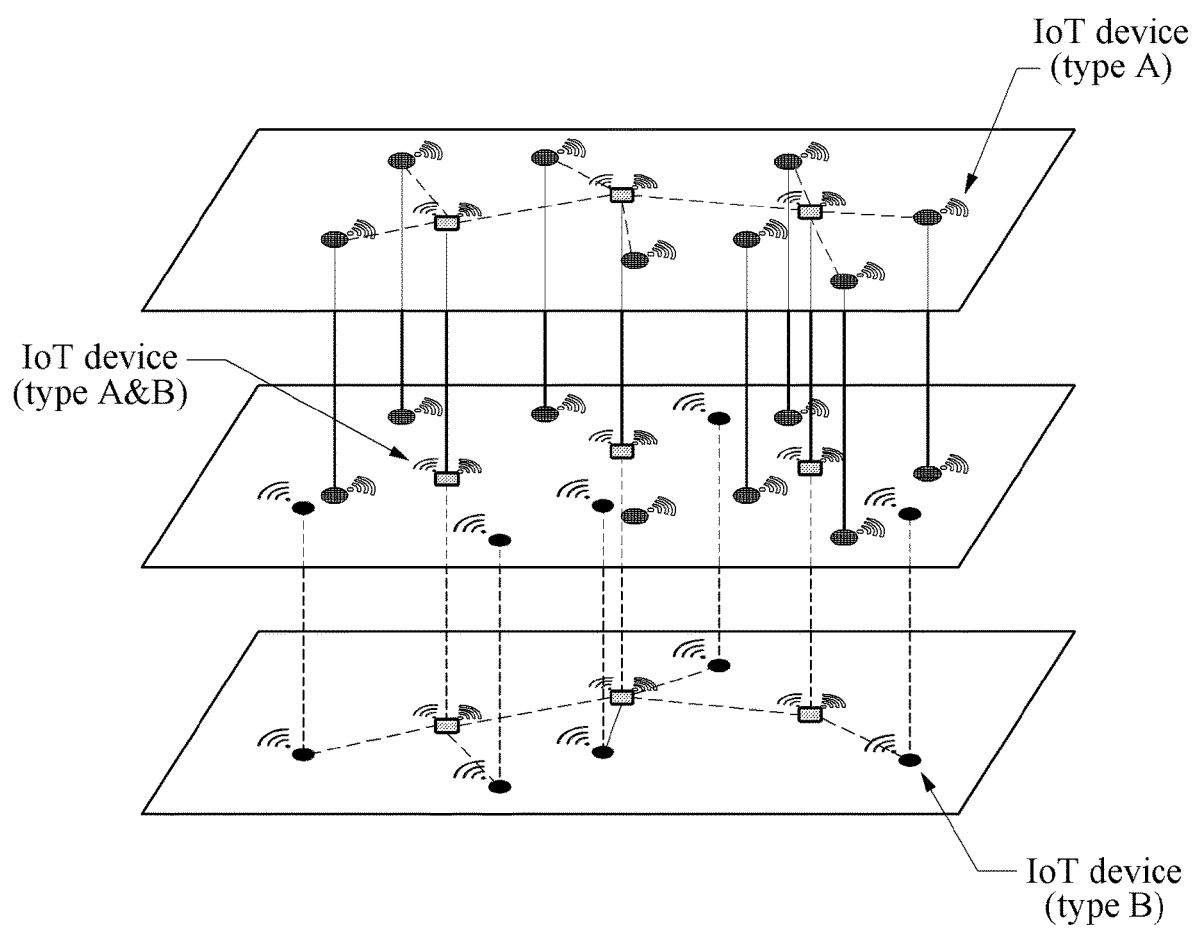
FIG. 7 is a diagram illustrating an example of a configuration of a heterogeneous SON in an IoT environment according to an example embodiment.

FIG. 7 is a diagram illustrating an example of a configuration of a heterogeneous SON in an IoT environment according to an example embodiment.

A network connectivity illustrated in FIG. 7 may be set based on an algorithm described above with reference to FIGS. 5 and 6.

An existing networking method that is traditionally used to establish or configure a network with homogeneous terminals having a same type of wireless communication technology may not be applied to an SON of IoT in which heterogeneous terminals are included. Even when the existing networking method is applied, not all nodes may communicate effectively. According to an example embodiment, it is possible to solve such an issue arising from the existing networking method and implement a more effective networking method.

Figure 8:
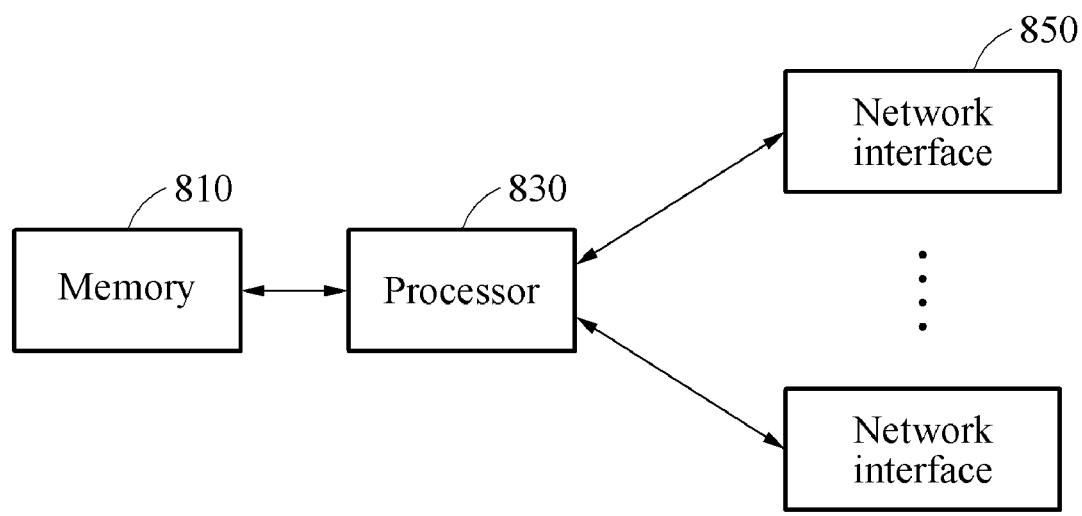
FIG. 8 is a diagram illustrating an example of an IoT device according to an example embodiment.

FIG. 8 is a diagram illustrating an example of an IoT device according to an example embodiment.

Referring to FIG. 8, an IoT device 800 includes a memory 810, a processor 830, and one or more network interfaces 850.

The memory 810 may store instructions or programs that are executable by the processor 830. For example, the instructions may be used to control the IoT device 800 to perform at least one operation to establish or configure a network with one or more neighboring IoT devices.

The processor 830 may control an overall operation of the IoT device 800. The processor 830 may be embodied by at least one processor including at least one core.

The processor 830 may execute instructions to establish or configure a network with one or more neighboring IoT devices. The instructions may be embedded in the processor 830.

In addition, the processor 830 may retrieve, fetch, or read the instructions from the memory 810 to execute the instructions. The processor 830 may write or record at least one result obtained by executing the instructions in the memory 810 or another memory (not shown), for example, an internal register, an internal cache, and a storage.

The processor 830 may perform at least one operation to control the IoT device 800 to establish or configure a network with one or more neighboring IoT devices.

For example, the processor 830 may determine a coordinator candidate and a coordinator for each of the network interfaces 850. For other operations, the descriptions provided above with reference to FIGS. 1 through 7 may be applied to the processor 830, and thus a more detailed and repeated description is omitted here for brevity.

The components or units described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform to the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A self-organizing network (SON) method performed by a first Internet of things (IoT) device, the SON method comprising:
receiving neighboring device information from at least one neighboring IoT device;
updating device information of the first IoT device based on the received neighboring device information; and
determining whether the first IoT device is a coordinator candidate based on at least one of a number of network interfaces, a number of neighbor links connected to the network interfaces, or a ratio of remaining energy, which is included in the updated device information,
wherein the coordinator candidate is a candidate for a coordinator configured to function as a network gateway,
wherein the determining comprises:
in response to the number of network interfaces being greater than or equal to 2, determining the first IoT device to be the coordinator candidate;
in response to the number of neighbor links connected to the network interfaces being greater than or equal to 2, determining the first IoT device to be the coordinator candidate; and
in response to the ratio of remaining energy being greater than a threshold value, determining the first IoT device to be the coordinator candidate.

2. The SON method of claim 1, wherein the number of network interfaces, the number of neighbor links connected to the network interfaces, and the ratio of remaining energy are considered in sequential order.

3. The SON method of claim 1, further comprising:
updating bit information included in the device information based on a result of the determining.

4. The SON method of claim 1, further comprising:
determining the coordinator among a plurality of neighboring IoT devices each being a coordinator candidate and configured to transmit device information, based on a network characteristic.

5. The SON method of claim 4, wherein the network characteristic includes at least one of energy, a network range, or a network speed.

6. The SON method of claim 4, wherein the determining of the coordinator comprises:
when energy-centric networking is required, determining, to be the coordinator, an IoT device having a greatest value of the ratio of remaining energy among the neighboring IoT devices;
when broadband networking is required, determining, to be the coordinator, an IoT device having a widest network interface range among the neighboring IoT devices; and
when networking requiring a communication speed and performance is required, determining, to be the coordinator, an IoT device having a greatest data transfer rate among the neighboring IoT devices.

7. The SON method of claim 6, wherein the energy-centric networking, the broadband networking, and the networking requiring a communication speed and performance are considered in sequential order.

8. The SON method of claim 4, wherein the determining of the coordinator is performed for each network interface.

9. A first Internet of things (IoT) device for a self-organizing network (SON), the first IoT device comprising:
at least one network interface; and
a processor configured to execute instructions to organize a network with at least one neighboring IoT device of the first IoT device through the network interface,
wherein, when the instructions are executed, the processor is configured to:
receive neighboring device information from the at least one neighboring IoT device;
update device information of the first IoT device based on the received neighboring device information; and
determine whether the first IoT device is a coordinator candidate based on at least one of a number of network interfaces, a number of neighbor links connected to the network interfaces, or a ratio of remaining energy, which is included in the updated device information,
wherein the coordinator candidate is a candidate for a coordinator configured to function as a gateway of the network,
wherein the processor is configured to:
in response to the number of network interfaces being greater than or equal to 2, determine the first IoT device to be the coordinator candidate;
in response to the number of neighbor links connected to the network interfaces being greater than or equal to 2, determine the first IoT device to be the coordinator candidate; and
in response to the ratio of remaining energy being greater than a threshold value, determine the first IoT device to be the coordinator candidate.

10. The IoT device of claim 9, wherein the processor is configured to consider the number of network interfaces, the number of neighbor links connected to the network interfaces, and the ratio of remaining energy, in sequential order.

11. The IoT device of claim 9, wherein the processor is configured to update bit information included in the device information based on a result of the determining.

12. The IoT device of claim 9, wherein the processor is configured to determine, to be the coordinator, among a plurality of neighboring IoT devices each being a coordinator candidate and configured to transmit device information, based on a network characteristic.

13. The IoT device of claim 12, wherein the network characteristic includes at least one of energy, a network range, or a network speed.

14. The IoT device of claim 12, wherein the processor is configured to:

when energy-centric networking is required, determine, to be the coordinator, an IoT device having a greatest value of the ratio of remaining energy among the neighboring IoT devices;

when broadband networking is required, determine, to be the coordinator, an IoT device having a widest network interface range among the neighboring IoT devices; and when networking requiring a communication speed and performance is required, determine, to be the coordinator, an IoT device having a greatest data transfer rate among the neighboring IoT devices.

15. The IoT device of claim 14, wherein the processor is configured to consider the energy-centric networking, the broadband networking, and the networking requiring a communication speed and performance, in sequential order.

16. The IoT device of claim 12, wherein the processor is configured to determine the coordinator for each network interface.

* * * * *